July 10, 1928.
W. M. CRONK
BRAKE TESTING GAUGE
Filed Oct. 6, 1926
1,676,774
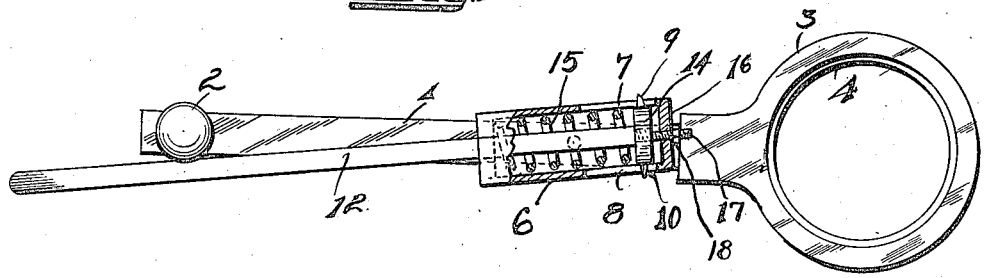
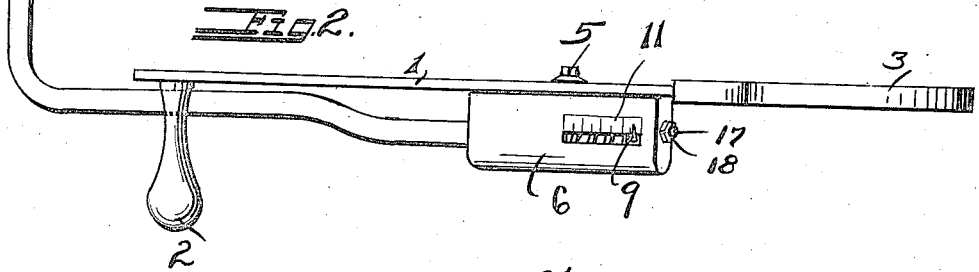
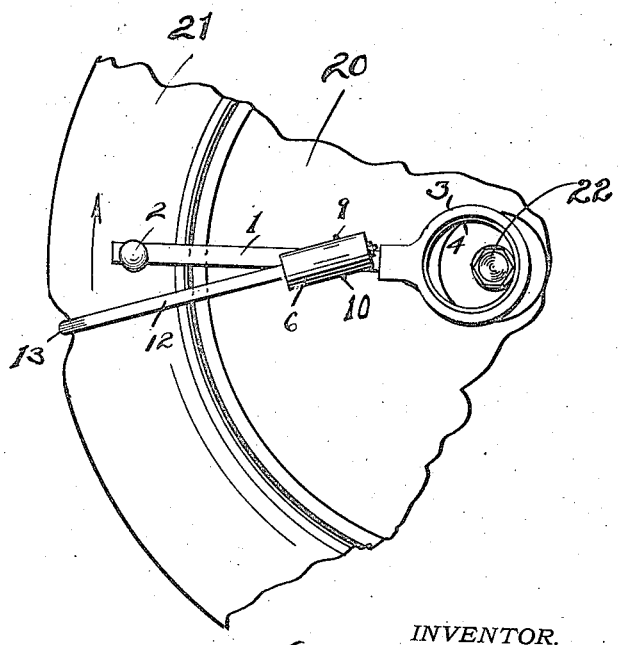
INVENTOR.
Wesley M. Cronk.
BY
Carlos P. Griffin
ATTORNEY.

Patented July 10, 1928.

1,676,774

UNITED STATES PATENT OFFICE.

WESLEY M. CRONK, OF BURLINGAME, CALIFORNIA, ASSIGNOR, BY DIRECT AND MESNE ASSIGNMENTS, TO MASTER PRODUCTS CORPORATION, OF SAN FRANCISCO, CALIFORNIA, A CORPORATION OF CALIFORNIA.

BRAKE-TESTING GAUGE.

Application filed October 6, 1926. Serial No. 139,897.

This invention relates to a brake testing gauge and its object is to provide means whereby the torque required to turn any wheel under a given adjustment of the brakes may be measured, the object being to so arrange the brake pressures as to have each wheel effect the proper retardation of the vehicle.

It will be understood by those skilled in the art that with the system of braking in use upon automobiles at the present time that it is very essential to have each brake apply the proper retarding effect to each wheel to prevent serious skidding of the automobile. With two wheel brakes if one wheel is braked too heavily it will cause that wheel to slide while the other wheel still rotates, while with four wheel brakes if the front wheels are retarded too strongly with respect to the rear wheels equally severe skidding effects are produced. It therefore becomes necessary to provide some means to determine the brake effect applied to each individual wheel in order to have the proper amount of braking effect on each wheel, and this apparatus is intended to supply that need.

This invention is an improvement upon the brake testing apparatus shown in patent application Serial No. 124,911, filed July 26, 1926.

Other objects of the invention will be apparent as the description proceeds.

An embodiment of the invention is shown in the accompanying drawings in which the same reference numeral is shown applied to the same portion throughout the several figures of the drawings and of which there may be modifications.

Figure 1 is a side elevation of the apparatus with the spring cylinder shown in section, Figure 2 is a plan view of the apparatus as it would appear in use, and Figure 3 is a side elevation of a portion of a wheel showing the apparatus applied thereto, and in process of determining the torque required to turn the wheel under any given setting of the brake band.

It will be understood by those skilled in the art that in determining the setting of the brakes some person or apparatus sets the brake lever in a given position and holds it there while the wheels to be twisted are all raised off the ground. This apparatus is then applied to the wheel and the amount of torque required to turn the wheel under the given brake setting is then determined, the brake bands being adjusted during the several tests until each front wheel holds the same amount and each back wheel holds the same amount.

The tester comprises a lever 1 with a laterally extending operating handle 2. At the end of the lever 1 opposite from the handle there is a large ring 3 which has inset in a groove thereof a rubber or leather bead 4 to prevent marring the paint on the wheel hubs.

Pivotally attached to the lever 1 by means of a bolt 5 is a spring cylinder 6. This spring cylinder has a slot 7 on one side and a similar slot 8 on the other side through which two small indicators 9 and 10 project. Each slot has a series of marks therein as indicated at 11 to serve as a guide for the workman in determining the pressure to be applied to turn the wheel. A rod 12 with a right angle bend 13 at one end extends into the cylinder 6. This rod has a washer 14 on the end inside the cylinder, and a stiff spring 15 bears on the washer to hold the indicator at zero of the scale.

The other end of the cylinder 6 is closed by means of a screw threaded disk 16. This disk has a screw 17 extending therethrough which bears on the washer 14, and it is provided with a lock nut 18, the object being to accurately set the indicators 9 and 10 to zero of the scale should they be slightly off when the apparatus is assembled.

The wheel is indicated at 20, and the tire at 21, the wheel axle appearing at 22. The hub cap in this case being removed as is necessary with some types of cars which have a rounding hub cap to which the ring is not easily applied, altho nearly all forms of hub caps are so shaped that the ring 3 can be used on them without removing the hub cap from the wheels.

The operation is as follows: Each tire used upon the machine must of course, be substantially the same in size as each other tire, and each tire must be inflated to the same pressure in order to make the test properly operable. The ring 3 is then placed over the hub cap or axle, and the hook 13 is placed on the outside of the tire as shown in Figure 3, is then applied upwardly as indicated by the arrow on the handle, to just turn the wheel, while the brakes are all held in a given adjustment. The effect will be to slightly dent the tire, as is somewhat exaggerated in Figure 3, with the result that the pressure applied to the handle will compress the spring 15 a given amount depending upon the tightness of the brake before the wheel will turn. The workman will then observe the position of the indicator 9 when the wheel just turns and will endeavor to set the brakes on the other wheel to the same adjustment.

What I claim is as follows, but modifications may be made in carrying out the invention as shown in the enclosed drawing and in the above particularly described form thereof, within the purview of the annexed claims.

1. A brake testing gauge for vehicles comprising a lever having a handle at one end and means at the other end to so engage the vehicle axle as to prevent outward movement of the lever with reference thereto, a pivotally mounted member carrying a rod having a hook on one end thereof capable of engaging the periphery of the wheel, a spring gauge on the other end of said rod in said member to indicate the compression of the spring when an attempt is made to turn the wheel by lifting upon the lever.

2. A brake testing gauge comprising a lever having a handle at one end and means at the other end to so engage the axle of a vehicle as to prevent outward movement of the lever with reference thereto, a member having a hook at one end and a part slidably connected thereto at the other end, said slidable part being pivotally mounted on said lever, said hook adapted to bear upon the periphery of a wheel, a spring intermediate said member and slidable part, and means on the bottom sides of said slidable part to indicate the compression of the spring when an attempt is made to turn the wheel whereby the testing device may be used on right and left hand wheels of an automobile.

3. A brake testing gauge comprising a lever having a handle projecting laterally at one end, means at the other end to so engage the axle of a vehicle as to prevent outward movement of the lever with reference thereto, a member carrying a rod having a hook to engage the periphery of the wheel pivotally mounted on the side of the lever, a spiral spring bearing upon the end of said member opposite the hook, and oppositely placed indicating hands operated by the spring whereby the amount of compression on the spring necessary to turn the vehicle wheel may be indicated.

4. A brake testing gauge comprising a lever, a handle at one end of the lever, means at the other end of the lever to engage the axle of the wheel, a cylindrical casing pivotally mounted on the side of the lever, a spiral spring within said casing, a rod slidably extending into the casing and having a hook at its outer end to engage the periphery of a wheel, means on the end of the rod within the casing to compress the spring when an attempt is made to turn a wheel with the gauge and an indicator to show the amount of compression of said spring when the wheel is being tested.

5. A brake testing gauge comprising a lever having a handle on one end and a ring on the other end, said ring having an annular groove therein, a resilient material in said groove, a cylindrical slotted casing having a flat side pivoted on said lever, a spring in said casing, a washer on the rod adapted to contact with said spring, a rod attached to said washer, a hook on the outer end of said rod adapted to engage a tire, there being indicating points on said washer extending through said casing slots and indicating characters on the edges of said slots.

In testimony whereof I have hereunto set my hand this 29" day of September, A. D. 1926.

WESLEY M. CRONK.